(12) United States Patent
Freeman et al.

(10) Patent No.: US 10,329,950 B2
(45) Date of Patent: Jun. 25, 2019

(54) NOZZLE GUIDE VANE WITH COMPOSITE HEAT SHIELD

(71) Applicants: Rolls-Royce Corporation, Indianapolis, IN (US); Rolls-Royce North American Technologies Inc., Indianapolis, IN (US)

(72) Inventors: Ted J. Freeman, Danville, IN (US); Jeffrey A. Walston, Indianapolis, IN (US); Jun Shi, Carmel, IN (US); Tara G. Schetzel, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 523 days.

(21) Appl. No.: 15/078,446

(22) Filed: Mar. 23, 2016

(65) Prior Publication Data

US 2017/0022829 A1    Jan. 26, 2017

Related U.S. Application Data

(60) Provisional application No. 62/136,835, filed on Mar. 23, 2015.

(51) Int. Cl.
  *F01D 25/12*  (2006.01)
  *F01D 9/04*  (2006.01)

(52) U.S. Cl.
  CPC ............. *F01D 25/12* (2013.01); *F01D 9/041* (2013.01); *F05D 2230/60* (2013.01); *F05D 2240/15* (2013.01); *F05D 2240/55* (2013.01); *F05D 2260/231* (2013.01); *F05D 2300/10* (2013.01); *F05D 2300/6033* (2013.01); *Y02T 50/672* (2013.01); *Y02T 50/675* (2013.01)

(58) Field of Classification Search
  CPC ...... F01D 25/12; F01D 9/041; F05D 2240/15; F05D 2230/60; F05D 2260/231; F05D 2300/6033; F05D 2300/10; F05D 2240/55; Y02T 50/675; Y02T 50/672
  See application file for complete search history.

(56) References Cited

U.S. PATENT DOCUMENTS

| 4,643,636 | A |   | 2/1987  | Zoltan et al. |             |
|-----------|---|---|---------|---------------|-------------|
| 6,000,906 | A | * | 12/1999 | Draskovich    | F01D 5/3084 |
|           |   |   |         |               | 415/189     |
| 6,884,030 | B2|   | 4/2005  | Darkins, Jr. et al. |       |
| 7,452,189 | B2| * | 11/2008 | Shi           | F01D 5/147  |
|           |   |   |         |               | 415/200     |
| 7,488,157 | B2|   | 2/2009  | Marini et al. |             |
| 7,604,456 | B2| * | 10/2009 | Schiavo, Jr.  | F01D 5/225  |
|           |   |   |         |               | 415/191     |
| 7,766,609 | B1|   | 8/2010  | Liang         |             |
| 8,096,758 | B2|   | 1/2012  | Schiavo       |             |
| 8,105,019 | B2|   | 1/2012  | McCaffrey et al. |          |
| 8,251,652 | B2|   | 8/2012  | Campbell et al. |           |

(Continued)

*Primary Examiner* — Matthew W Jellett
(74) *Attorney, Agent, or Firm* — Barnes & Thornburg LLP (57) ABSTRACT

A nozzle guide vane for a gas turbine engine is disclosed herein. The nozzle guide vane includes an inner endcap, an outer endcap, and at least one airfoil that extends from the inner endcap to the outer endcap. The nozzle guide vane further includes at least one composite heat shield component adapted to shield metallic components from high temperature gasses.

20 Claims, 7 Drawing Sheets

(56) References Cited

U.S. PATENT DOCUMENTS

| | | |
|---|---|---|
| 8,292,580 B2 | 10/2012 | Schiavo et al. |
| 2010/0021290 A1* | 1/2010 | Schaff .................... F01D 5/147 |
| | | 415/200 |
| 2011/0110772 A1 | 5/2011 | Arrell et al. |
| 2014/0169956 A1 | 6/2014 | Lyders |
| 2015/0003989 A1* | 1/2015 | Uskert .................... F01D 9/044 |
| | | 416/220 R |

* cited by examiner

NOZZLE GUIDE VANE WITH COMPOSITE HEAT SHIELD

CROSS REFERENCE TO RELATED APPLICATIONS

This application claims priority to and the benefit of U.S. Provisional Patent Application No. 62/136,835, filed 23 Mar. 2015, the disclosure of which is now expressly incorporated herein by reference.

FIELD OF THE DISCLOSURE

The present disclosure relates generally to vanes used in gas turbine engines, and more specifically to vanes used in gas turbine engines that contain composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils and supporting structures to temperatures that require the airfoils and supporting structures to be made from high-temperature resistant materials and/or to be actively cooled by supplying relatively cool air to the vanes and blades. To this end, some composite materials adapted to withstand very high temperatures are being incorporated into vane and blade design. Design and manufacture of vanes and blades including composite components presents challenges.

SUMMARY

The present disclosure may comprise one or more of the following features and combinations thereof.

According to the present disclosure, a nozzle guide vane for a gas turbine engine may include a metallic support structure and an airfoil. The metallic support structure may include an inner endcap formed to include an inner attachment aperture and an outer endcap formed to include an outer attachment aperture. The outer endcap may be spaced from the inner endcap in a radial direction. The airfoil may include an aerodynamic feature shaped to redirect gasses moving through a gas path between the inner end cap and the outer endcap, an inner attachment feature that extends from the aerodynamic feature into the inner attachment aperture of the inner endcap, and an outer attachment feature that extends from the aerodynamic feature into the outer attachment aperture of the outer endcap.

In illustrative embodiments, the nozzle guide vane may also include a ceramic-matrix composite heat shield system adapted to shield the metallic support structure from hot gasses moving through the gas path. The ceramic-matrix composite heat shield system may include an inner heat shield arranged radially between the inner endcap and the gas path and an outer heat shield comprising ceramic-matrix composite materials arranged radially between the outer endcap and the gas path.

In illustrative embodiments, the outer heat shield may be sandwiched between the aerodynamic feature and the outer endcap. The inner heat shield may be sandwiched between the aerodynamic feature and the inner endcap.

In illustrative embodiments, the inner heat shield may be formed to include an inner locator aperture. The outer heat shield may be formed to include an outer locator aperture. The inner attachment feature may extend through the inner locator aperture to slide relative to the inner heat shield without interference. The outer attachment feature may extend through the outer locator aperture to slide relative to the outer heat shield without interference.

In illustrative embodiments, the inner locator aperture and outer locator aperture may be smaller than the aerodynamic feature when the aerodynamic feature is viewed in the radial direction. Accordingly, part of the heat shield system may be located between the aerodynamic feature and the metallic support structure.

In illustrative embodiments, the nozzle guide vane may include a cooling gap between the outer endcap and the outer heat shield. The outer endcap may be formed to include protrusions that contact the outer heat shield and extend across the cooling gap to define the radial size of the cooling gap.

In illustrative embodiments, the airfoil may consist essentially of a metallic alloy. The inner and outer attachment features of the airfoil may be fixed to the metallic support structure by a braze joint or a bicast joint.

In illustrative embodiments, the inner and outer heat shields may each formed to include a forward hanger that extends around a forward axial face of the metallic support structure or an aft hanger that extends around an aft axial face of the metallic support structure.

In illustrative embodiments, the nozzle guide vane may include a gasket system. The gasket system may include an inner gasket in contact with and arranged radially between the aerodynamic feature and the inner heat shield and an outer gasket in contact with and arranged radially between the aerodynamic feature and the outer heat shield.

In illustrative embodiments, the inner gasket may be formed to include an inner gasket aperture. The outer gasket may be formed to include an outer gasket aperture. The inner attachment feature may extend through the inner gasket aperture. The outer attachment feature may extend through the outer gasket aperture.

In illustrative embodiments, the inner gasket may be disposed within an inner cavity that extends radially inwardly into the inner heat shield. The outer gasket may be disposed within an outer cavity that extends radially outwardly into the outer heat shield.

In illustrative embodiments, the inner gasket may be shaped to match an inner surface of the aerodynamic feature. The outer gasket may be shaped to match an outer surface of the aerodynamic feature.

In illustrative embodiments, the inner cavity may be shaped to match an inner surface of the aerodynamic feature. The outer cavity may be shaped to match an outer surface of the aerodynamic feature. Accordingly an inner portion of the aerodynamic feature may be received in the inner cavity and an outer portion of the aerodynamic feature may be received in the outer cavity.

In illustrative embodiments, the nozzle guide vane may include a gasket system that includes an inner gasket in contact with and arranged radially between the inner heat shield and the inner endcap and an outer gasket in contact with and arranged radially between the outer heat shield and the outer endcap. The inner gasket may be disposed within an inner cavity that extends radially inwardly into the inner endcap and the outer gasket may be disposed within an outer cavity that extends radially outwardly into the outer endcap.

In illustrative embodiments, the inner heat shield may be sized to cover substantially all of a radially outer face of the inner endcap that is exposed to the gas path. The outer heat shield may be sized to cover substantially all of a radially inner face of the outer endcap that is exposed to the gas path.

According to another aspect of the present disclosure, a gas turbine engine assembly may include a metallic support structure formed to include an attachment aperture and an airfoil. The airfoil may include an aerodynamic feature shaped to interact with flow path gasses and an attachment feature that extends from the aerodynamic feature into the attachment aperture. The attachment feature may be fixed to the metallic support.

In illustrative embodiments, the assembly may include a ceramic-matrix composite heat shield arranged radially between the metallic support structure and the aerodynamic feature to shield the metallic support structure from hot gasses interacting with the aerodynamic feature. The attachment feature may extend through a locator hole formed in the ceramic-matrix composite heat shield to slide relative to the ceramic-matrix composite heat shield without interference. The locator aperture may be smaller than the aerodynamic feature such that the heat shield is held in place between the aerodynamic feature and the metallic support structure. In illustrative embodiments, the attachment feature of the airfoil may be fixed to the metallic support structure by a braze joint or a bicast joint.

According to another aspect of the present disclosure, a method for assembling a nozzle guide vane for a gas turbine engine is taught. The method may include providing an airfoil including an aerodynamic feature, an inner attachment feature that extends from the aerodynamic feature, and an outer attachment feature that extends from the aerodynamic feature. The method may also include arranging a ceramic-matrix composite heat shield adjacent to the aerodynamic feature so that the inner attachment feature extends through an inner locator aperture in the heat shield and the outer attachment feature extends through an outer locator aperture in the heat shield to place the aerodynamic feature in contact with the heat shield. The method may also include arranging the airfoil adjacent to a metallic support structure so that the inner attachment feature extends into an inner attachment aperture of an inner endcap of the metallic support structure and the outer attachment feature extends into an outer attachment aperture of an outer endcap of the metallic support structure. The method may also include securing the attachment features to the metallic support structure.

In illustrative embodiments, the method may include arranging an inner gasket between the aerodynamic feature and the inner heat shield and arranging an outer gasket between the aerodynamic feature and the outer heat shield.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
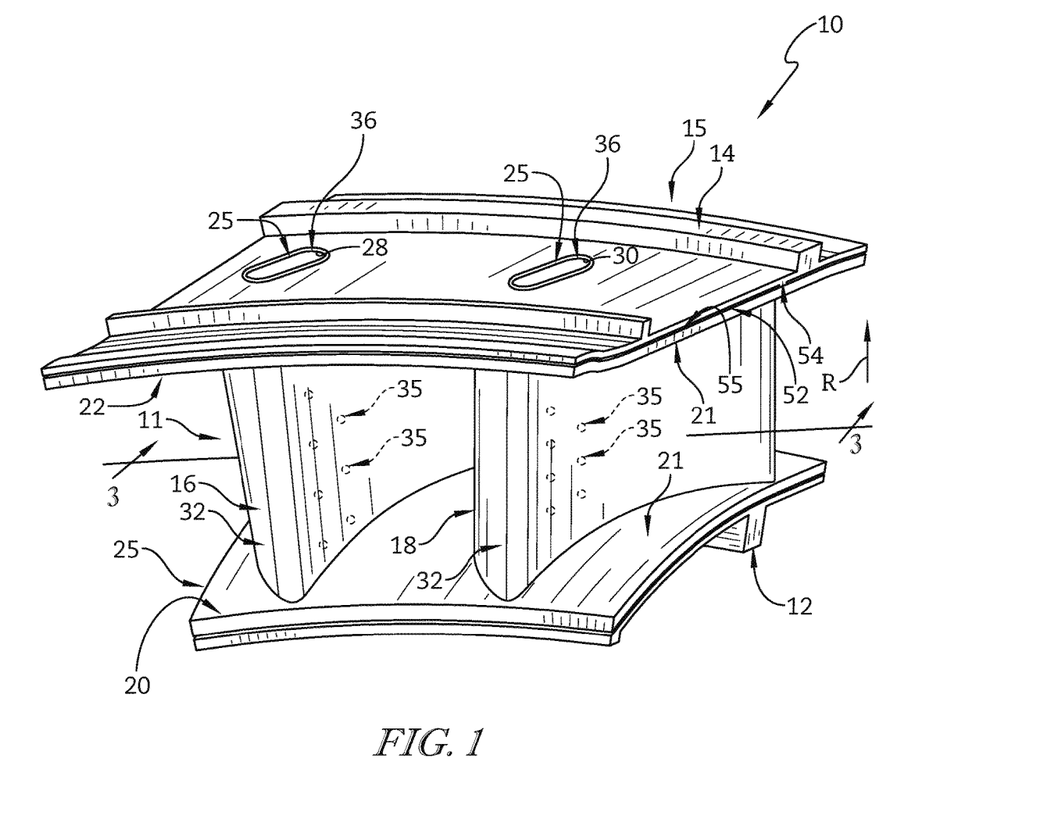
FIG. 1 is perspective view of a nozzle guide vane assembly adapted for use in a gas turbine engine.
Figure 2:
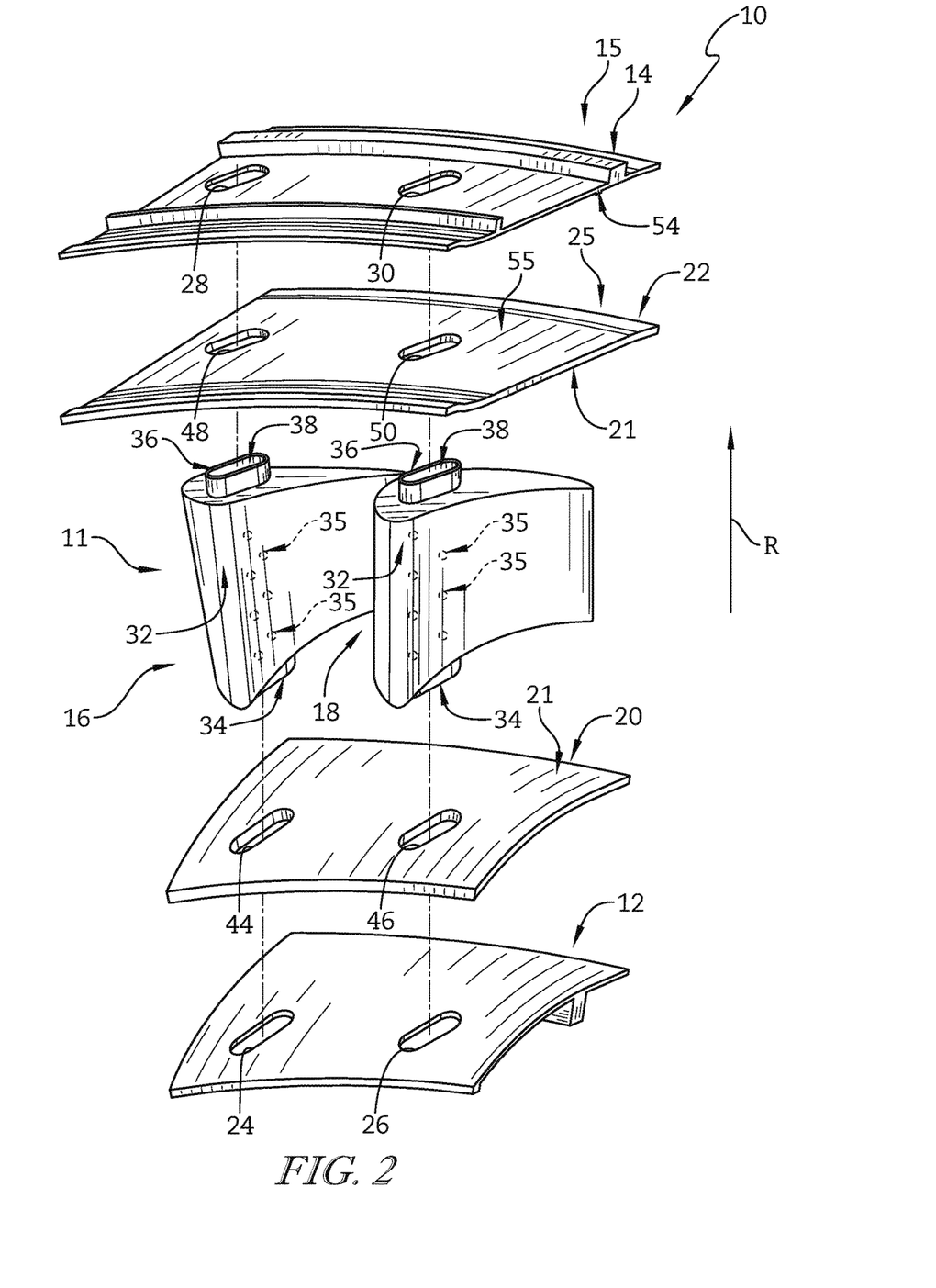
FIG. 2 is an exploded perspective assembly view of the nozzle guide vane assembly included in FIG. 1 showing that the nozzle guide vane assembly includes metallic inner and outer endcaps, metallic airfoils, and ceramic-matrix composite heat shields adapted to shield the metallic end caps from hot gasses moving through the gas path.

A first illustrative nozzle guide vane assembly 10 for use in a gas turbine engine is shown in FIG. 1. The nozzle guide vane 10, sometimes simply called a vane assembly or vane 10, includes endcaps 12, 14, airfoils 16, 18, and ceramic-matrix composite heat shields 20, 22 as shown in FIGS. 1 and 2. The endcaps 12, 14 are illustratively made from a metallic material are adapted to be attached to cases or other structures within a gas turbine engine. The airfoils 16, 18 illustratively interconnect the endcaps 12, 14 and are adapted to redirect gasses moving through a gas path 11 between the endcaps 12, 14. The heat shields 20, 22 are made from high-temperature-resistant ceramic-matrix composite material and shield the endcaps 12, 14 from hot gasses moving through the gas path 11.

The endcaps 12, 14 illustratively cooperate to provide a metallic support structure 15 for the vane assembly 10 that can be attached to a turbine case as suggested in FIG. 1. The metallic support structure 15 illustratively includes inner endcap 12 and outer endcap 14 which is spaced from inner endcap 12 in a radial direction R as shown in FIGS. 1 and 2. The inner endcap 12 is formed to include inner attachment apertures 24, 26 adapted to receive portions of the airfoils 16, 18; and, similarly, the outer endcap 14 is formed to include outer attachment apertures 28, 30 adapted to receive portions of the airfoils 16, 18 as shown in FIG. 2.

Figure 3:
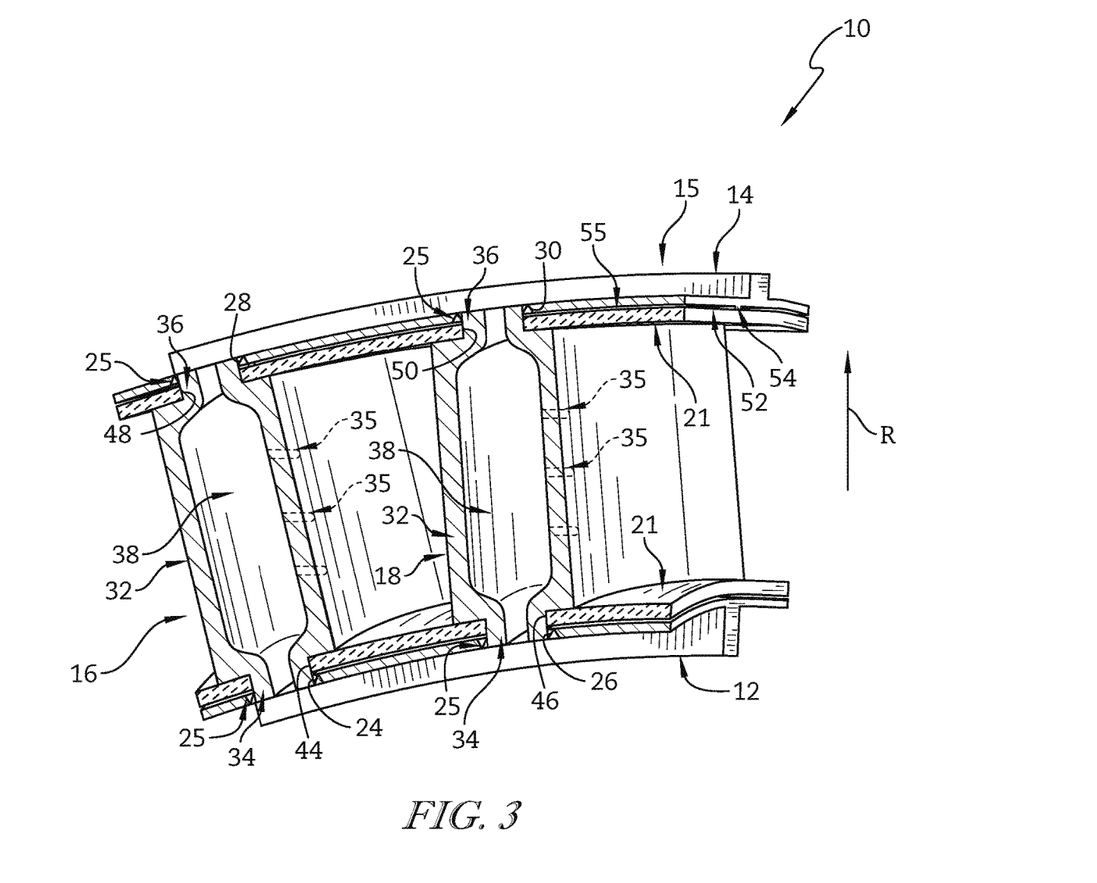
FIG. 3 is a cross-sectional view of the nozzle guide vane assembly included in FIG. 1 taken along line 3-3 showing that the airfoils of the vane assembly include an aerodynamic feature shaped to redirect gasses moving through a gas path, an inner attachment post that extends through an inner heat shield into the inner endcap, and an outer attachment post that extends through an outer heat shield into the outer endcap.

The airfoils 16, 18 are illustratively made from metallic material (e.g. nickel- or cobalt based alloys) and extend across the gas path 11 defined by the heat shields 20, 22 between the endcaps 12, 14 as shown in FIGS. 1 and 3. The airfoil 16 and the airfoil 18 are substantially similar and each includes an aerodynamic feature 32, an inner attachment post 34, and an outer attachment post 36 as shown in FIGS. 2 and 3. The aerodynamic features 32 are shaped to redirect gasses moving through the gas path 11. The inner attachment posts 34 extend from the aerodynamic features 32 into the inner attachment aperture 24, 26 of the inner endcap 12 to couple the airfoils 16, 18 to the inner end cap 12. Similarly, the outer attachment posts 36 extend from the aerodynamic features 32 into the outer attachment apertures 28, 30 of the outer endcap 14 to couple the airfoils 16, 18 to the outer end cap 14.

In the illustrative embodiment, the airfoils 16, 18 are integrally formed components such that the aerodynamic feature 32 and attachment posts 34, 36 form a monolithic piece (for example, a monolithic casting). In some embodiments, the airfoils 16, 18 may be integral in that the aerodynamic feature 32 is coupled to the attachment posts 34, 36 by welding, brazing, or bicasting. In some embodiments, the airfoils 16, 18 may be wholly or partially made from other materials such as ceramic-matrix composite material. In one such embodiment, the airfoils 16, 18 may include a ceramic-matrix composite aerodynamic feature and metallic attachment posts. In another such embodiment, the entire airfoil 16, 18 may be made from ceramic-matrix composite material.

The inner and outer attachment posts 34, 36 of the airfoils 16, 18 are illustratively coupled to the inner and outer endcaps 12, 14 of the metallic support structure 15 by a bonding layer 25 so that the airfoils 16, 18 are fixed to the metallic support structure 15 as shown in FIG. 3. In the illustrative embodiment, the inner and outer attachment posts 34, 36 of the airfoils 16, 18, sometimes called attachment features, are welded, brazed, or bicast to the inner and outer endcaps 12, 14. However, in some embodiments, the inner and outer attachment posts 34, 36 of the airfoils 16, 18 by be bolted, pinned, or attached to the inner and outer endcaps 12, 14 in another suitable manner. In some embodiments, the airfoils 16, 18 may be cantilevered such that only one of the inner and outer attachment posts 34, 36 of the airfoils 16, 18 is coupled to a corresponding one of the inner and outer endcaps 12, 14.

Each airfoil 16, 18 is further formed to include a cooling air passageway 38 as shown in FIG. 3. The cooling air passageway 38 is sized to conduct air through the airfoils 16, 18 across the gas path 11 to cool the airfoils during use of the vane assembly 10. In some embodiments, the aerodynamic features 32 of the airfoils may include bleed holes 35 that allow cooling air to leak out of the passageway 38 and cool the outer surface of the airfoils 16, 18.

The illustrative embodiment includes two airfoils 16, 18 such that the nozzle guide vane 10 shown may be called a doublet as suggested in FIG. 1. However, it is contemplated that the nozzle guide vane 10 may include one or more airfoils while still falling within the scope of the present disclosure.

The heat shields 20, 22 illustratively cooperate to provide a heat shield system 25 adapted to shield the metallic support structure from hot gasses moving through the gas path 11 as suggested in FIG. 1. The heat shield system 25 illustratively includes inner heat shield 20 and outer heat shield as shown in FIGS. 1 and 2. The inner heat shield 20 is sized to cover substantially all of the radially outer face of the inner endcap 12 that is exposed to the gas path 11; similarly, the outer heat shield 22 is sized to cover substantially all of the radially inner face of the outer endcap 14 that is exposed to the gas path 11 as shown in FIG. 1.

The inner heat shield 20 is illustratively formed to include inner locator apertures 44, 46 sized to receive the inner attachment posts 34 of the airfoils 16, 18 so that the posts 34 may slide without interference as shown in FIG. 2. Similarly, the outer heat shield 22 is formed to include inner locator apertures 48, 50 sized to receive the outer attachment posts 36 of the airfoils 16, 18 so that the posts 36 may slide without interference. However, the locator apertures 44, 46, 48, 50 are sized to block entry of the aerodynamic features 32 included in the airfoils 16, 18 so that the heat shields 20, 22 are trapped between the aerodynamic features 32 and the support structure 15 provided by the endcaps 12, 14.

As noted above, the heat shields 20, 22 are made from high-temperature-resistant ceramic-matrix composite material as suggested in FIG. 3. More specifically, in the illustrative embodiment, the heat shields 20, 22 are made from silicon-carbide reinforcements (e.g. chopped fiber, weaves, braids, fabrics) suspended in silicon-carbide matrix. In other embodiments, the heat shields 20, 22 may be made from other composite or non-composite materials. Optionally environmental barrier coating 21 may be applied to the gas path facing surfaces of the heat shields 20, 22.

By allowing the attachment posts 34, 36 to slide within the locator apertures 44, 46, 48, 50, the vane assembly 10 may be designed to allow relative movement between the airfoils 16, 18 and the heat shields 20, 22. Such relative movement may be induced during use of the vane assembly 10 in a gas turbine engine because the vane assembly 10 is likely to be exposed to various temperatures. When exposed to different temperatures, the metallic components of the vane assembly 10 are likely to expand and contract at a rate different from the composite components of the vane assembly 10.

In the illustrative embodiment, a cooling gap 52 is formed between the outer endcap 14 and the outer heat shield 22 as shown in FIG. 1. In the illustrative embodiment, a protrusion 54 formed by the outer endcap 14 spaces the majority of the outer heat shield 22 a small distance from the outer heat shield 22 to form the cooling gap 52. In some embodiments, the protrusions 54 may be formed by the outer heat shields 22 or may be floated between the outer endcap 14 and the outer heat shield 22.

In some embodiments, an environmental barrier coating 55 may be applied to the radially outer face of the outer heat shield 22 to reduce the effectiveness of cooling air flowing into the cooling gap 52. By controlling the effectiveness of cooling air in the cooling gap 52 on the outer heat shield 22, control of thermal gradients induced on the outer heat shield 22 may be achieved while still providing a desired level of cooling to the other components exposed to the cooling gap 52.

In some embodiments, a cooling gap and/or environmental barrier coating may also be provided along the radially inner face of the inner heat shield 20. In such embodiments, protrusions or other spacers may be incorporated into the inner endcap 12, the inner heat shield 20, or may be floated between the two.

Ceramic-matrix composite (CMC) material such as that used in the heat shield system 25 can sustain much higher temperatures than traditional metal alloys. Therefore CMC material may be desirable in gas turbine engines where higher fuel efficiencies can be reached with higher temperatures. The turbine section of gas turbine engines is often especially susceptible to high temperatures, so ceramic matrix composites may provide benefit when incorporated into turbine section designs. Moreover, the amount of cooling air that would be required for a metal component may be reduced when ceramic matrix composite components are used. Additionally, CMC material is less dense than metal, thus giving the opportunity to save weight on the engine, which again may help fuel efficiency.

The present disclosure describes the use of CMC in the turbine, specifically on the endwalls of a vane component. Both endwalls of the vane would have CMC heat shields 20, 22 that protect the metal endcap 12, 14 structure from the hot temperatures of the flowpath 11. The airfoil may be made from a traditional metal alloy, and may have a step on both ends to allow the CMC endwall heat shields 20, 22 to be located and constrained. The CMC heat shields 20, 22 may have discrete openings to allow the upper and lower portions 34, 36 of the airfoil 16, 18 to protrude through the CMC. The airfoil protrusions 34, 36 may then be attached to a metal support structure 15, and may potentially joined with a bicast clip. The CMC endwalls would thus be trapped between the step on the airfoil 16, 18 and the metal support structure 15.

The CMC heat shield system provides a heat shield to the metal endcaps 12, 14, which may allow temperatures to increase and cooling air usage to decrease. Potentially radial outer diameter nozzle flow could be reduced as well, which would reduce mixing loss. Cooling air could be routed between the CMC heat shields 20, 22 and the metal endcaps 12, 14 structure to allow backside cooling of the CMC heat shields 20, 22. In order to route this air between the CMC heat shields 20, 22 and the metal endcaps 12, 14, a gap distance (e.g. cooling gap 52) may be maintained. This gap could be upheld by manufacturing small protrusions 54 into the metal endcaps 12, 14. The protrusions 54 come into contact with the CMC heat shields 20, 22 and maintain a predetermined amount of clearance that may be optimized for cooling flow.

The nozzle guide vane 10 may be assembled by arranging the heat shields 20, 22 adjacent to the aerodynamic features 32 of the airfoils 16, 18 so that the inner attachment posts 34 extend through the inner locator apertures 44, 46 in the inner heat shield 20 and the outer attachment posts 36 extend through the outer locator apertures 48, 50 in the outer heat shield 22. The method may also include arranging the airfoils 16, 18 so that the inner attachment posts 34 extend into the inner attachment apertures 24, 26 of the inner endcap 12 and the outer attachment posts 36 extend into the outer attachment apertures 28, 30 of the outer endcap 14. The method may further include securing the attachment posts 34, 36 to inner and outer endcaps 12, 14 of the metallic support structure 15.

Figure 4:
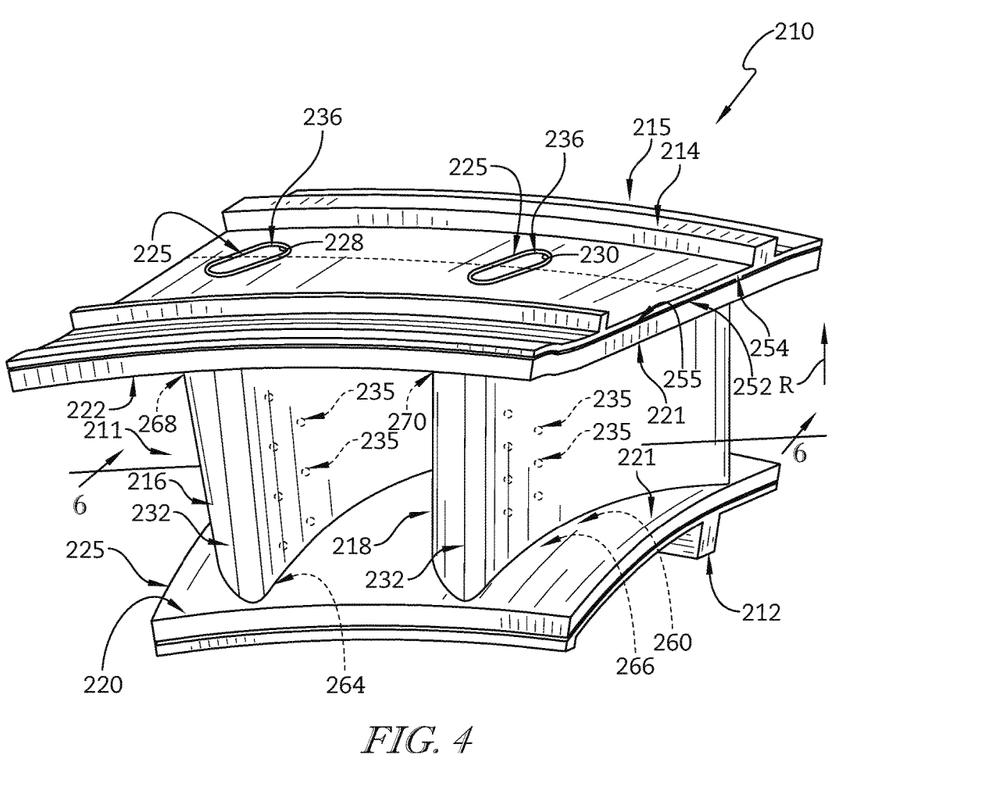
FIG. 4 is perspective view of a second nozzle guide vane assembly adapted for use in a gas turbine engine.
Figure 5:
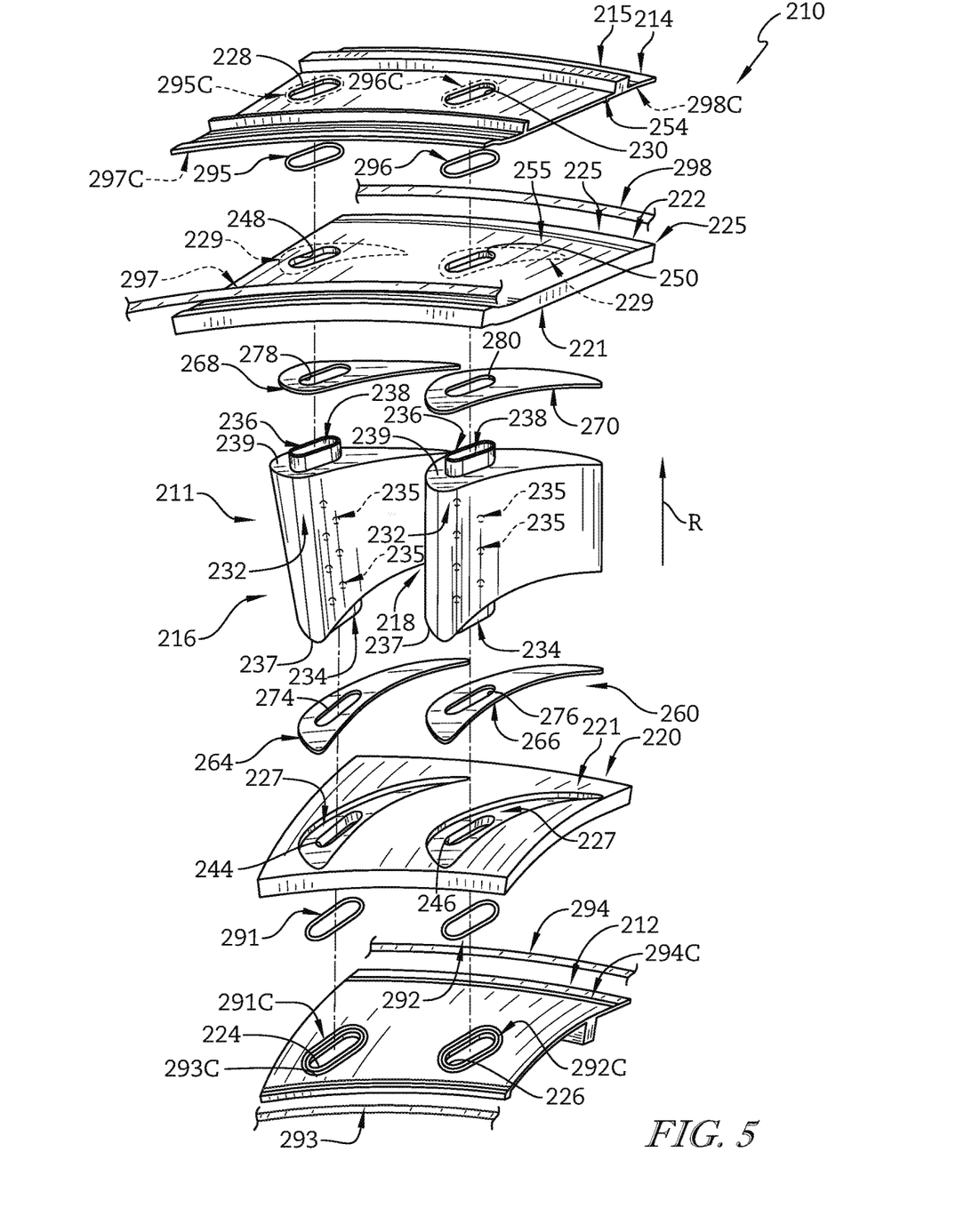
FIG. 5 is an exploded perspective assembly view of the nozzle guide vane assembly included in FIG. 4 showing that the nozzle guide vane assembly includes metallic endcaps, metallic airfoils, ceramic-matrix composite heat shields adapted to shield the metallic end caps, and gaskets arranged between other components.
Figure 6:
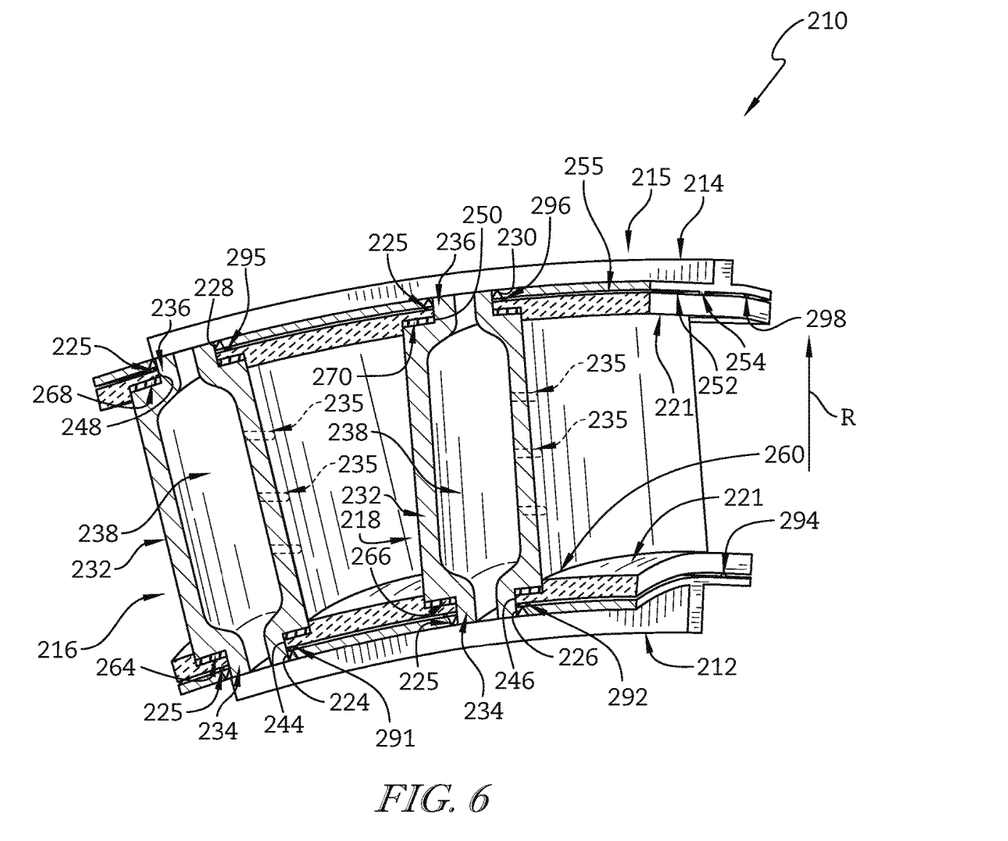
FIG. 6 is a cross-sectional view of the nozzle guide vane assembly included in FIG. 4 taken along line 6-6 showing that the airfoils of the vane assembly include an aerodynamic feature shaped to redirect gasses moving through a gas path, an inner attachment post that extends through an inner heat shield and an inner gaskets into the inner endcap, and an outer attachment post that extends through an outer heat shield and an outer gaskets into the outer endcap.

A second illustrative nozzle guide vane 210 is shown in FIGS. 4-6. The nozzle guide vane 210 is configured for use in a gas turbine engine and is substantially similar to the nozzle guide vane 10 shown in FIGS. 1-3. Accordingly, similar reference numbers in the 200 series indicate features that are common between the nozzle guide vane 10 and the nozzle guide vane 210. The description of the nozzle guide vane 10 is hereby incorporated by reference to apply to the nozzle guide vane 210, except in instances when it conflicts with the specific description and drawings of the nozzle guide vane 10.

The nozzle guide vane 210 illustratively includes a gasket system 260 as shown in FIGS. 5 and 6. The gasket system 260 includes inner gaskets 264, 266 and outer gaskets 268, 270. The inner gaskets 264, 266 are in contact with and arranged radially between the aerodynamic features 232 of the airfoils 216, 218 and the inner heat shield 220. The outer gaskets 268, 270 are in contact with and arranged radially between the aerodynamic features 232 of the airfoils 216, 218 and the outer heat shield 222. The gaskets 264, 266 illustratively provide flow discouragers that resist the flow of gasses at the interface between the airfoils 216, 218 and the heat shields 220, 222.

The inner gaskets 264, 266 are each formed to include an inner gasket aperture 274, 276 and the outer gaskets 268, 270 are each formed to include an outer gasket aperture 278, 280 as shown in FIG. 5. The inner attachment posts 234 of the airfoils 216, 218 extend through the inner gasket apertures 274, 276 to locate the inner gaskets 264, 266. The outer attachment posts 236 of the airfoils 216, 218 extend through the outer gasket apertures 278, 280 to locate the outer gaskets 268, 270.

In the illustrative embodiment, the inner gaskets 264, 266 are shaped to match an inner radial surface 237 of the aerodynamic features 232 as shown in FIG. 5. Similarly, the outer gaskets 268, 270 are shaped to match an outer radial surface 239 of the aerodynamic feature 232 as shown in the illustrative embodiment. In some embodiments, the gaskets 264, 266, 268, 270 may have other shapes.

The inner gaskets 264, 266 are illustratively disposed within inner cavities 227 that extend radially inwardly into the inner heat shield 220 as suggested in FIG. 5. Similarly, the outer gaskets 268, 270 are disposed within outer cavities 229 that extend radially outwardly into the outer heat shield 222. The inner cavities 227 are shaped to match the inner radial surface 237 of the aerodynamic feature 232 and the outer cavities 229 are shaped to match the outer radial surface 239 of the aerodynamic feature 232 such that inner portions of the aerodynamic features 232 may be received in the inner cavities 227 and outer portions of the aerodynamic features 232 may be received in the outer cavity 229.

The nozzle guide vane 210 is assembled like the nozzle guide vane 10 except that assembling the nozzle guide vanes 210 may include inserting the attachment posts 234, 236 of the airfoils 216, 218 through the gasket apertures 274, 276, 278, 280 as suggested in FIG. 5. In yet another additional step, assembling the nozzle guide vanes 210 may include arranging the gaskets 264, 266, 268, 270 in the cavities 227, 229 of the heat shields 220, 222.

In the illustrative embodiment, the gasket system 260 also includes gaskets 291, 292, 293, 294, 295, 296, 297, 298 arranged between the heat shields 220, 222 and the endcaps 212, 214 as shown in FIG. 5. The gaskets 291, 292, 293, 294, 295, 296, 297, 298 are illustratively made from ceramic-containing rope seals but may be made from sheets or strips of suitable gasket material.

Illustratively, each of the gaskets 291, 292, 293, 294, 295, 296, 297, 298 is received in a corresponding cavity or groove 291C, 292C, 293C, 294C, 295C, 296C, 297C, 298C as suggested in FIG. 5. Each cavity 291C, 292C, 293C, 294C, 295C, 296C, 297C, 298C is illustratively formed in an endcap 212, 214; however, in other embodiments some or all of the cavities 291C, 292C, 293C, 294C, 295C, 296C, 297C, 298C may be formed in the heat shields 220, 222.

The gaskets 291, 292, 295, 296 are illustratively arranged to extend around the attachment posts 234, 236 of the airfoils 216, 218 as shown in FIG. 5. The gaskets 291, 292, 295, 296 discourage air from flowing between the attachment posts 234, 236 of the airfoils 216, 218 and the heat shields 220, 222.

The gaskets 293, 294, 297, 298 are arranged to extend along the forward and aft faces of the metallic support structure 215 and the heat shield system 225 between the endcaps 212, 214 and the heat shields 220, 222 as shown in FIG. 5. The gaskets 293, 294, 297, 298 discourage undesired air from flowing between the endcaps 212, 214 and the heat shields 220, 222.

Figure 7:
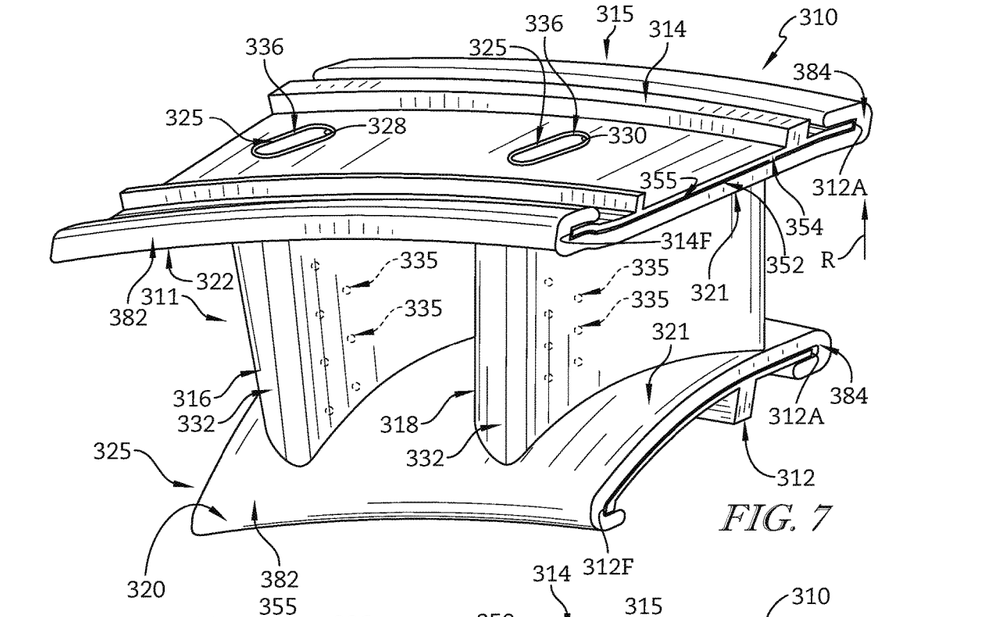
FIG. 7 is perspective view of a third nozzle guide vane assembly adapted for use in a gas turbine engine showing that the nozzle guide vane assembly includes metallic inner and outer endcaps, metallic airfoils, and ceramic-matrix composite heat shields adapted to shield the metallic end caps from hot gasses moving through the gas path.
Figure 8:
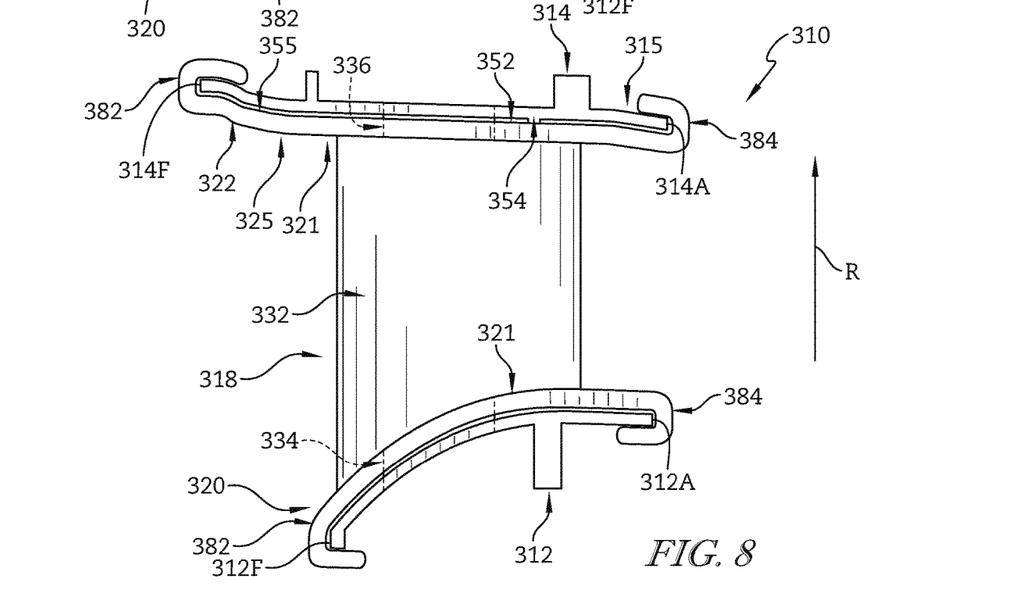
FIG. 8 is a side elevation view of the nozzle guide vane of FIG. 7 showing that the inner and outer heat shields are formed to include forward and aft hangers that extend around forward and aft ends of the metallic end caps.

A third illustrative nozzle guide vane 310 is shown in FIGS. 7 and 8. The nozzle guide vane 310 is configured for use in a gas turbine engine and is substantially similar to the nozzle guide vane 10 shown in FIGS. 1-3. Accordingly, similar reference numbers in the 300 series indicate features that are common between the nozzle guide vane 10 and the nozzle guide vane 310. The description of the nozzle guide vane 10 is hereby incorporated by reference to apply to the nozzle guide vane 310, except in instances when it conflicts with the specific description and drawings of the nozzle guide vane 10.

Inner and outer heat shields 320, 322 of the nozzle guide vane 310 are formed to include forward and aft hangers 382, 384 that extend around forward and aft axial faces 312F, 312A, 314F, 314A of the inner and outer endcaps 312, 314 included in the metallic support structure 315 as shown in FIGS. 7 and 8. The forward and aft hangers 382, 384 function to couple the inner and outer heat shields 320, 322 of the heat shield system 325 to the metallic support structure 315. In some embodiments, only one, two, or three of the hangers 382, 384 shown in the illustrative embodiment are included in the heat shield system 325.

The nozzle guide vane 310 is assembled like the nozzle guide vane 10 except that the Inner and outer heat shields 320, 322 must slide circumferentially onto the inner and outer endcaps 312, 314 as suggested in FIGS. 7 and 8. The sliding step must take place before the attachment posts 334, 336 of airfoils 316, 318 are arranged in the apertures of the inner and outer heat shields 320, 322 and the inner and outer endcaps 312, 314.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A nozzle guide vane for a gas turbine engine, the nozzle guide vane comprising
a metallic support structure including an inner endcap formed to include an inner attachment aperture and an outer endcap formed to include an outer attachment aperture, the outer endcap spaced from the inner endcap in a radial direction,
an airfoil including an aerodynamic feature shaped to redirect gasses moving through a gas path between the inner end cap and the outer endcap, an inner attachment feature that extends from the aerodynamic feature into the inner attachment aperture of the inner endcap, and an outer attachment feature that extends from the aerodynamic feature into the outer attachment aperture of the outer endcap, and
a ceramic-matrix composite heat shield system adapted to shield the metallic support structure from hot gasses moving through the gas path, the ceramic-matrix composite heat shield system including an inner heat shield arranged radially between the inner endcap and the gas path and an outer heat shield comprising ceramic-matrix composite materials arranged radially between the outer endcap and the gas path,
wherein the inner heat shield is formed to include an inner locator aperture, the outer heat shield is formed to include an outer locator aperture, and the entire inner locator aperture and the entire outer locator aperture are smaller than the aerodynamic feature when the aerodynamic feature is viewed in the radial direction to overlap the heat shields with the aerodynamic feature, a cooling gap between the outer endcap and the outer heat shield.

2. The nozzle guide vane of claim 1, wherein the outer heat shield is sandwiched between the aerodynamic feature and the outer endcap and the inner heat shield is sandwiched between the aerodynamic feature and the inner endcap.

3. The nozzle guide vane of claim 2, wherein the inner attachment feature extends through the inner locator aperture to slide relative to the inner heat shield without interference, and the outer attachment feature extends through the outer locator aperture to slide relative to the outer heat shield without interference.

4. The nozzle guide vane of claim 3, wherein at least part of the heat shield system is located between the aerodynamic feature and the metallic support structure.

5. The nozzle guide vane of claim 1, wherein the outer endcap is formed to include protrusions that contact the outer heat shield and extend across the cooling gap to define the radial size of the cooling gap.

6. The nozzle guide vane of claim 1, wherein the airfoil consists essentially of a metallic alloy.

7. The nozzle guide vane of claim 6, wherein the inner and outer attachment features of the airfoil are fixed to the metallic support structure by a braze joint or a bicast joint.

8. The nozzle guide vane of claim 1, wherein the inner and outer heat shields are each formed to include at least one of a forward hanger that extends around a forward axial face of the metallic support structure and an aft hanger that extends around an aft axial face of the metallic support structure.

9. The nozzle guide vane of claim 1, further comprising a gasket system including an inner gasket in contact with and arranged radially between the aerodynamic feature and the inner heat shield and an outer gasket in contact with and arranged radially between the aerodynamic feature and the outer heat shield.

10. The nozzle guide vane of claim 9, wherein the inner gasket is formed to include an inner gasket aperture, the outer gasket is formed to include an outer gasket aperture, the inner attachment feature extends through the inner gasket aperture, and the outer attachment feature extends through the outer gasket aperture.

11. The nozzle guide vane of claim 9, wherein the inner gasket is disposed within an inner cavity that extends radially inwardly into the inner heat shield and the outer gasket is disposed within an outer cavity that extends radially outwardly into the outer heat shield.

12. The nozzle guide vane of claim 11, wherein the inner gasket is shaped to match an inner surface of the aerodynamic feature and the outer gasket is shaped to match an outer surface of the aerodynamic feature.

13. The nozzle guide vane of claim 11, wherein the inner cavity is shaped to match an inner surface of the aerodynamic feature and the outer cavity is shaped to match an outer surface of the aerodynamic feature such that an inner portion of the aerodynamic feature may be received in the inner cavity and an outer portion of the aerodynamic feature may be received in the outer cavity.

14. The nozzle guide vane of claim 1, further comprising a gasket system including an inner gasket in contact with and arranged radially between the inner heat shield and the inner endcap and an outer gasket in contact with and arranged radially between the outer heat shield and the outer endcap.

15. The nozzle guide vane of claim 14, wherein the inner gasket is disposed within an inner cavity that extends radially inwardly into the inner endcap and the outer gasket is disposed within an outer cavity that extends radially outwardly into the outer endcap.

16. A gas turbine engine assembly, the assembly comprising
    a metallic support structure formed to include an attachment aperture,
    an airfoil including an aerodynamic feature shaped to interact with flow path gasses and an attachment feature that extends from the aerodynamic feature into the attachment aperture, the attachment feature fixed to the metallic support, and
    a ceramic-matrix composite heat shield arranged radially between the metallic support structure and the aerodynamic feature to shield the metallic support structure from hot gasses interacting with the aerodynamic feature,
    wherein the attachment feature extends through and engages a locator aperture formed in the ceramic-matrix composite heat shield to slide relative to the ceramic-matrix composite heat shield without interference and the locator aperture is smaller than the aerodynamic feature to overlap the ceramic-matrix composite heat shield such that the heat shield is held in place between the aerodynamic feature and the metallic support structure, and
    wherein a cooling gap is formed between the metallic support structure and the heat shield to provide cooling air to a backside of the heat shield.

17. A method for assembling a nozzle guide vane for a gas turbine engine, the method comprising
    providing an airfoil including an aerodynamic feature, an inner attachment feature that extends from the aerodynamic feature, and an outer attachment feature that extends from the aerodynamic feature,
    arranging inner and outer ceramic-matrix composite heat shields adjacent to the aerodynamic feature so that the inner attachment feature extends through and engages an inner locator aperture in the inner heat shield and the outer attachment feature extends through and engages an outer locator aperture in the outer heat shield to place the aerodynamic feature in contact with the inner and outer heat shields,
    arranging the airfoil adjacent to a metallic support structure so that the inner attachment feature extends into an inner attachment aperture of an inner endcap of the metallic support structure and the outer attachment feature extends into an outer attachment aperture of an outer endcap of the metallic support structure, wherein the inner locator aperture and the outer locator aperture is smaller than the aerodynamic feature to overlap the inner and outer ceramic-matrix composite heat shields with the aerodynamic feature and a cooling gap is formed between the outer endcap and the outer heat shield to provide cooling air to a backside of the outer heat shield, and
    securing the attachment features to the metallic support structure.

18. The method of claim 17, further comprising arranging an inner gasket between the aerodynamic feature and the inner heat shield and arranging an outer gasket between the aerodynamic feature and the outer heat shield.

19. The gas turbine engine assembly of claim 16, wherein the metallic support structure is formed to include protrusions that contact the heat shield and extend across the cooling gap to define the radial size of the cooling gap.

20. The gas turbine engine assembly of claim 17, wherein the outer endcap is formed to include protrusions that contact the outer heat shield and extend across the cooling gap to define the radial size of the cooling gap.

* * * * *